(12) United States Patent
Hwang

(10) Patent No.: US 6,994,267 B2
(45) Date of Patent: Feb. 7, 2006

(54) TEMPERATURE/HUMIDITY CONTROL SYSTEM FOR A FUEL CELL STACK AND A METHOD THEREOF

(75) Inventor: Byoung Woo Hwang, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/747,902

(22) Filed: Dec. 29, 2003

(65) Prior Publication Data

US 2005/0077364 A1    Apr. 14, 2005

(30) Foreign Application Priority Data

Oct. 10, 2003  (KR) ................... 10-2003-0070620

(51) Int. Cl.
  *H01M 8/04*  (2006.01)
  *H01M 8/12*  (2006.01)
(52) U.S. Cl. ............. 236/44 C; 236/44 A; 429/24; 429/26
(58) Field of Classification Search ........... 236/44 A, 236/44 C; 429/13, 22, 24, 26
See application file for complete search history.

(56) References Cited

U.S. PATENT DOCUMENTS

| 6,436,562 | B1 * | 8/2002 | DuBose ............... 429/13 |
| 6,777,120 | B2 * | 8/2004 | Nelson et al. ........ 429/22 |
| 2002/0055023 | A1 | 5/2002 | Rueegge et al. |
| 2002/0164509 | A1 * | 11/2002 | Wheat et al. ........ 429/22 |
| 2003/0186093 | A1 * | 10/2003 | St-Pierre et al. ..... 429/13 |
| 2004/0131900 | A1 * | 7/2004 | Cargnelli et al. ..... 429/13 |
| 2004/0142221 | A1 * | 7/2004 | Kawamura et al. ... 429/24 |
| 2004/0185315 | A1 * | 9/2004 | Enjoji et al. ......... 429/22 |

FOREIGN PATENT DOCUMENTS

| JP | 11-283651 | 10/1999 |
| JP | 2002-164231 | 6/2000 |
| JP | 2002-124279 | 4/2002 |
| KR | 10-2003-0018921 | 3/2003 |

* cited by examiner

*Primary Examiner*—Marc Norman
(74) *Attorney, Agent, or Firm*—Morgan Lewis & Bockius LLP

(57) ABSTRACT

The temperature/humidity control system includes a humidifying device having a vibrator to convert water into vapor. The control system also includes, a storage member storing the vapor generated by the vibrator, and at least one mixing member to humidify hydrogen and air supplied to the fuel cell stack with the vapor stored in the storage member. The control system fuel cell includes a preheating device configured to preheat the hydrogen and air humidified by the mixing member, and at least one temperature sensor detecting temperatures of hydrogen and air having passed the preheating device and a temperature of coolant of the fuel cell stack. Finally, the control system includes at least one humidity sensor detecting humidities of hydrogen and air having passed the humidifying devices, and a fuel cell control unit controlling the humidifying device and the preheating device based on signals of the temperature sensor and the humidity sensor.

33 Claims, 5 Drawing Sheets

TEMPERATURE/HUMIDITY CONTROL SYSTEM FOR A FUEL CELL STACK AND A METHOD THEREOF

CROSS-REFERENCE TO RELATED APPLICATIONS

This application claims priority of Korean Application No. 10-2003-0070620, filed Oct. 10, 2003, the disclosure of which is incorporated fully herein by reference.

FIELD OF THE INVENTION

The present invention relates to a temperature/humidity control system for a fuel cell stack, and a control method thereof.

BACKGROUND OF THE INVENTION

Generally, in order to generate electric power in a fuel cell stack, hydrogen ions must transfer to a cathode through a membrane. Also, the membrane must be humid for the transferring of the hydrogen ions.

When the hydrogen ions transfer to the cathode, the hydrogen ions take water molecules. Therefore, in order to maintain the humidity of the membrane at an appropriate level, it is needed to humidify hydrogen that is supplied to the fuel cell stack.

There are two general methods for humidifying the hydrogen: one is an internal humidifying method in which humidifying is performed within the fuel cell stack, and the other is an external humidifying method in which the hydrogen is humidified outside of the fuel cell stack.

The internal humidifying method has various advantages because it makes it possible to simultaneously generate electric power and humidify of the hydrogen within the fuel cell stack so that a fuel cell stack can be easily installed in a vehicle.

In the external humidifying method, a humidifier includes a vibrator converting water into vapor, and a blower that transfers the vapor to a hydrogen supply line and an air supply line. According to operational condition changes, amounts of generated vapor and transferred vapor are controlled, thereby supplying optimal humidity to the membrane.

In such a prior humidifying system, the vapors generated by the vibrator and supplied to the hydrogen supply line and the air supply line require a plurality of blowers. This increases power consumption and requires separate control logic.

Furthermore, to control the amounts of generated vapor and transferred vapor, a plurality of control logic paths and control circuits are needed. Therefore, optimization of the control logic becomes very difficult.

Still further, a temperature drop caused by a pressure drop of the hydrogen and caused by the mixing of vapors with hydrogen and air cannot be compensated.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Embodiments of the present invention provide a temperature/humidity control system for a fuel cell stack in which hydrogen and air supplied to a fuel cell stack can be effectively preheated and humidified.

In a preferred embodiment of the present invention, the temperature/humidity control system for a fuel cell stack comprises: a humidifying device having a vibrator configured to convert water into vapor, a storage member storing the vapor generated by the vibrator, and at least one mixing member configured to humidify hydrogen and air that are supplied to the fuel cell stack with the vapor stored in the storage member; a preheating device configured to preheat the hydrogen and air humidified by the mixing member; at least one temperature sensor detecting temperatures of the hydrogen and the air having passed the preheating device and a temperature of coolant of the fuel cell stack, and outputting corresponding signals; at least one humidity sensor detecting humidities of the hydrogen and the air having passed the humidifying device, and outputting corresponding signals; and a fuel cell control unit controlling the humidifying device and the preheating device based on the signals of the temperature sensor and the humidity sensor.

It is preferable that the mixing member comprises: a first mixing member disposed in a hydrogen supply line; and a second mixing member disposed in an air supply line.

It is further preferable that each of the first mixing member and the second mixing member includes a venturi tube that is configured to suck the vapor from the storage member by a pressure drop due to speed increases of hydrogen flow and air flow.

It is preferable that the preheating device comprises: a first preheating member that is disposed in a hydrogen supply line; and a second preheating member that is disposed in an air supply line.

It is further preferable that each of the first and second preheating members includes a variable resistor that is able to emit heat by a current flow therethrough.

Preferably, the preheating device comprises at least one preheating member configured to emit heat using supplied current, and a preheating switch being able to selectively electrically connect the preheating member and an electric power source together in response to a control signal of the fuel cell control unit, and wherein the humidifying device further comprises a vibrator operating switch that is configured to selectively electrically connect the vibrator and the electric power source together.

Preferably, the control system further comprises an accumulator that is configured to store water generated by a reaction between hydrogen and water in the fuel cell stack.

Further preferably, the control system comprises a drain portion that is installed to the accumulator, the drain portion being configured to exhaust water stored therein when an amount of stored water is greater than a specific level.

It is preferable that the at least one temperature sensor comprises: a first temperature sensor detecting a temperature of hydrogen having passed the preheating device; and a second temperature sensor detecting a temperature of air having passed the preheating device.

It is further preferable that the fuel cell control unit controls the preheating device to preheat hydrogen supplied to the fuel cell stack, if a hydrogen temperature detected by the first temperature sensor is lower than a first predetermined temperature, and wherein the fuel cell control unit controls the preheating device to preheat air supplied to the fuel cell stack, if an air temperature detected by the second temperature sensor is lower than the first predetermined temperature.

It is also preferable that the fuel cell control unit wherein the fuel cell control unit controls the preheating device to not preheat hydrogen supplied to the fuel cell stack if a hydrogen temperature detected by the first temperature sensor is higher than a second predetermined temperature, and wherein the fuel cell control unit controls the preheating device to not preheat air supplied to the fuel cell stack if an air temperature detected by the second temperature sensor is higher than the second predetermined temperature.

It is preferable that the preheating device is connected to the fuel cell stack through a first passage and the accumulator is connected to the preheating device through a second passage such that coolant in the fuel cell stack can be transferred to the accumulator via the preheating device, that a first valve is disposed within the first passage to control a flow of coolant from the fuel cell stack to the preheating device, that a second valve is disposed within the second passage to control a flow of coolant from the preheating device to the accumulator, and that operations of the first and second valves are controlled by the fuel cell control unit.

It is further preferable that the preheating device includes a variable resistor, a resistance of which is controlled by the fuel cell control unit and that is configured to emit heat according to a current flow, and wherein the at least one temperature sensor includes a third temperature sensor detecting a temperature of coolant in the fuel cell stack, and wherein the fuel cell control unit controls the first and second valves to be open and the variable resistor to lower the resistance thereof if a coolant temperature detected by the third temperature sensor is higher than a third predetermined temperature.

It is still further preferable that the control unit controls the first and second valves to be open and the preheating device to not operate if the coolant temperature detected by the third temperature sensor is higher than a fourth predetermined temperature.

It is also preferable that the fourth predetermined temperature is determined as a temperature to which hydrogen and air supplied to the fuel cell stack can be preheated only by the coolant that is transferred to the accumulator from the fuel cell stack via the preheating device.

It is preferable that the at least one humidity sensor comprises: a first humidity sensor detecting a humidity of hydrogen having passed the humidifying device, and outputting a corresponding signal; and a second humidity sensor detecting a humidity of air having passed the humidifying device, and outputting a corresponding signal.

It is further preferable that the fuel cell control unit controls the vibrator such that an amount of vapor generated by the vibrator is increased if at least one of a hydrogen humidity detected by the first humidity sensor and an air humidity detected by the second humidity sensor is lower than a first predetermined humidity.

It is preferable that the fuel cell control unit controls the vibrator such that an amount of vapor generated by the vibrator is decreased if both of the hydrogen humidity detected by the first humidity sensor and the air humidity detected by the second humidity sensor are higher than a second predetermined humidity.

Preferably, the at least one temperature sensor comprises a third temperature sensor detecting a temperature of coolant in the fuel cell stack, and wherein the fuel cell control unit controls hydrogen and air supplied to the fuel cell stack to be preheated by at least one of the preheating device and the coolant in the fuel cell stack, based on the detected coolant temperature.

Further preferably, the hydrogen and the air supplied to the fuel cell stack are preheated only by the preheating device if the coolant temperature is lower than a third predetermined temperature.

Preferably, the hydrogen and the air supplied to the fuel cell stack are preheated by the preheating device and the coolant in the fuel cell stack if the coolant temperature is between the third predetermined temperature and a fourth predetermined temperature.

Preferably, the hydrogen and the air supplied to the fuel cell stack are preheated only by the coolant if the coolant temperature is higher than a fourth predetermined temperature.

In an embodiment of the present invention, the temperature/humidity control method for a fuel cell stack using a humidifying device capable of humidifying hydrogen and air supplied to the fuel cell stack and a preheating device capable of preheating the hydrogen and air supplied to the fuel cell stack comprises: detecting temperatures of the hydrogen and the air having passed the preheating device; detecting humidities of the hydrogen and the air having passed the humidifying device; and controlling the humidifying device and the preheating device based on the temperatures and humidities of the hydrogen and the air.

In an embodiment of the present invention, the temperature control method for a fuel cell stack using a preheating device capable of preheating hydrogen and air supplied to the fuel cell stack, comprises: detecting a temperature of the hydrogen having passed the preheating device; detecting a temperature of the air having passed the preheating device; and controlling the preheating device based on the detected hydrogen temperature and the detected air temperature.

It is preferable that the controlling the preheating device controls the preheating device to preheat the hydrogen supplied to the fuel sell stack if the detected hydrogen temperature is lower than a first predetermined temperature, and wherein the controlling the preheating device controls the preheating device to preheat the air supplied to the fuel cell stack if the detected air temperature is lower than the first predetermined temperature.

It is also preferable that the controlling the preheating device controls the preheating device to not preheat the hydrogen supplied to the fuel cell stack if the detected hydrogen temperature is higher than a second predetermined temperature, and wherein the controlling the preheating device controls the preheating device to not preheat the air supplied to the fuel cell stack if the detected air temperature is higher than the second predetermined temperature.

Preferably, the control method further comprises: detecting a temperature of coolant in the fuel cell stack; and allowing the coolant to circulate in the preheating device to preheat the hydrogen and the air supplied to the fuel cell stack, and simultaneously decreasing the amount of heat generated by the preheating device if the detected coolant temperature is higher than a third predetermined temperature.

Further preferably, the control method comprises allowing the coolant to circulate in the preheating device to preheat the hydrogen and the air supplied to the fuel cell stack and stopping an operation of the preheating device if the detected temperature is higher than a fourth predetermined temperature.

It is preferable that the fourth predetermined temperature is determined as a temperature at which the hydrogen and the air supplied to the fuel cell stack can be preheated only by the coolant to a specific temperature.

Preferably, the control method further comprises detecting a temperature of coolant inside the fuel cell stack, and the controlling the preheating device controls hydrogen and air supplied to the fuel cell stack to be preheated by at least one of the preheating device and the coolant in the fuel cell stack, based on the detected coolant temperature.

It is preferable that the hydrogen and the air supplied to the fuel cell stack are preheated only by the preheating device if the coolant temperature is lower than a third predetermined temperature.

It is also preferable that the hydrogen and the air supplied to the fuel cell stack are preheated by the preheating device and the coolant in the fuel cell stack if the coolant temperature is between the third predetermined temperature and a fourth predetermined temperature.

It is preferable that the hydrogen and the air supplied to the fuel cell stack are preheated only by the coolant if the coolant temperature is higher than a fourth predetermined temperature.

In an embodiment of the present invention, the humidity control method for a fuel cell stack using a humidifying device having a vibrator converting water into vapor and capable of humidifying hydrogen and air supplied to the fuel cell stack comprises: detecting a humidity of the hydrogen having passed the humidifying device; detecting a humidity of the air having passed the humidifying device; and controlling the humidifying device based on the detected hydrogen humidity and the detected air humidity.

It is preferable that the controlling the humidifying device controls the vibrator such that an amount of vapor generated by the vibrator is increased if at least one of a hydrogen humidity detected by the first humidity sensor and an air humidity detected by the second humidity sensor is lower than a first predetermined humidity.

It is also preferable that the controlling the humidifying device controls the vibrator such that an amount of vapor generated by the vibrator is decreased if both of a hydrogen humidity detected by the first humidity sensor and an air humidity detected by the second humidity sensor are higher than a second predetermined humidity.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Figure 1:
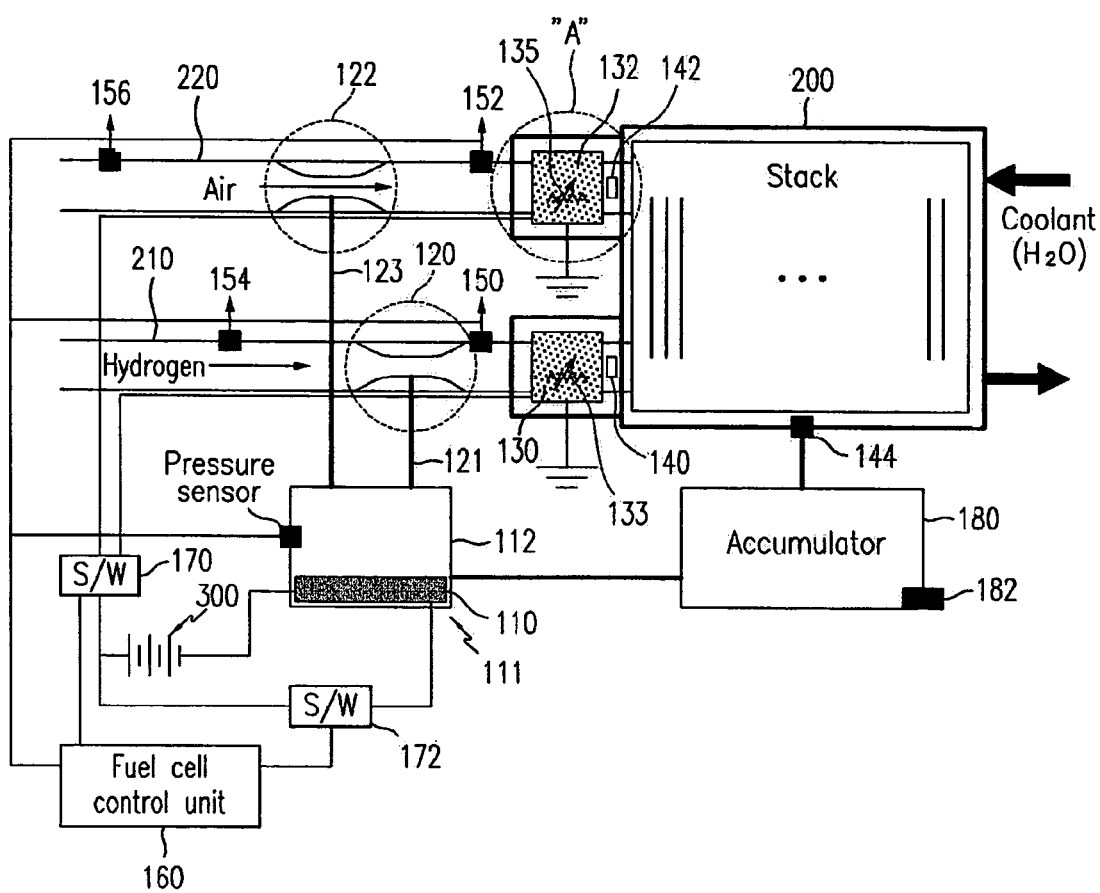
FIG. 1 is a schematic diagram of a temperature/humidity control system according to a embodiment of the present invention.

Hereinafter, a preferred embodiment of the present invention will be described in detail with reference to the accompanying drawings.

The temperature/humidity control system of the fuel cell stack according to the embodiment of the present invention comprises a humidifying device 111 for humidifying hydrogen and air supplied to a fuel cell stack 200, a preheating device for preheating the hydrogen and the air supplied to the fuel cell stack 200, and a fuel cell control unit 160 for controlling the humidifying device 111 and the preheating device.

The humidifying device 111 comprises a vibrator 110 for converting water into vapor, a storage member 112 configured to store vapor generated by the vibrator 110, and a first mixing member 120 and a second mixing member 122 configured to humidify the hydrogen and the air, respectively, with the vapor stored in the storage member 112. In the first and second mixing members 120 and 122, the vapor is mixed with the hydrogen and the air, and thereby the hydrogen and the air are humidified.

The vibrator 110 is a device that converts water into vapor by vibration. The vibrator 110 can convert water into vapor using little energy. The storage member 112 is preferably a reservoir for storing the vapor generated by the vibrator 110. The storage member 112 is a buffer between generation and consumption of the vapor.

The first mixing member 120 is installed in a hydrogen supply line 210, and is connected to the storage member 112 through a vapor supply passage 121. The vapor in the storage member 112 is transmitted to the first mixing member 120 through the vapor supply passage 121 and is mixed with the hydrogen, and thereby the hydrogen supplied to the fuel cell stack 200 is humidified.

The second mixing member 122 is installed in an air supply line 220, and is connected to the storage member 112 through a vapor supply passage 123. The vapor in the storage member 112 is transmitted to the second mixing member 122 through the vapor supply passage 123, and is mixed with the air, and thereby the air supplied to the fuel cell stack 200 is humidified.

The first mixing member 120 and the second mixing member 122 may be venturi tubes that are integrally formed respectively in the hydrogen supply line 210 and the air supply line 220. While the hydrogen and the air pass through the venturi tubes, pressure drops occur because of increases of flows of the hydrogen and the air, and accordingly the vapor stored in the storage member 112 is sucked into the venturi tube.

The preheating device includes a first preheating member 130 that is mounted to the hydrogen supply line 210 and is configured to preheat the hydrogen supplied to the fuel cell stack 200, and a second preheating member 132 that is mounted to the air supply line 220 and is configured to preheat the air supplied to the fuel cell stack 200.

The first preheating member 130 and the second preheating member 132 respectively includes variable resistors 133 and 135.

A first temperature sensor 140 is disposed in the hydrogen supply line 210 downstream of the first preheating member 130. The first temperature sensor 140 detects a temperature of the hydrogen and outputs a corresponding signal to the fuel cell control unit 160.

A second temperature sensor 142 is disposed in the air supply line 220 downstream of the second preheating member 132. The second temperature sensor 142 detects a temperature of the air and outputs a corresponding signal to the fuel cell control unit 160.

A third temperature sensor 144 is installed in the fuel cell stack 200. The third temperature sensor 144 detects a temperature of coolant of the fuel cell stack 200 and outputs a corresponding signal to the fuel cell control unit 160.

A first humidity sensor 150 is disposed in the hydrogen supply line 210 downstream of the first mixing member 120, and a second humidity sensor 152 is disposed in the air supply line 220 downstream of the second mixing member 122. The first humidity sensor 150 and the second humidity sensor 152 detect humidities of the hydrogen and the air, respectfully, at their positions, and output corresponding signals to the fuel cell control unit 160.

Furthermore, a third humidity sensor 154 is disposed in the hydrogen supply line 210 upstream of the first mixing member 120, and a fourth humidity sensor 156 is disposed in the air supply line 220 upstream of the second mixing member 122. The third humidity sensor 154 and the fourth humidity sensor 156 detect humidities of the hydrogen and the air, respectfully, and output corresponding signals to the fuel cell control unit 160.

The fuel cell control unit 160 preferably includes a processor, a memory, and other necessary hardware and software components as will be understood by persons skilled in the art, to permit the control unit to communicate with sensors and execute the control functions as described herein.

The fuel cell control unit 160 determines optimal preheating and humidifying based on the signals input from the above-stated sensors, and controls the humidifying device 111 and the preheating device 131. For example, the fuel cell control unit 160 regulates temperatures of the hydrogen and the air supplied to the fuel cell stack 200 only using the first preheating member 130 and the second preheating member 132 during an early stage of starting of the fuel cell stack 200. The early stage of the starting of the fuel cell stack 200 can be determined based on a temperature of the coolant in the fuel cell stack 200. As an example, if the coolant temperature is lower than a predetermined temperature (e.g., 30° C.), the early stage of the starting of the fuel cell stack 200 is determined.

The fuel cell control unit 160 regulates temperatures of the hydrogen and the air using the first preheating member 130, the second preheating member 132, and the coolant of the fuel cell stack 200 after the starting of the fuel cell stack 200. For example, if the coolant temperature is in a predetermined temperature range (e.g., a range between 30° C. and 80° C.), it can be determined that starting has been completed.

In addition, the fuel cell control unit 160 preferably regulates temperatures of the hydrogen and the air only using the coolant of the fuel cell stack 200 in a normal operational state of the fuel cell stack 200. For example, if the coolant temperature is higher than a predetermined temperature (e.g., 80° C.), it can be determined that the fuel cell stack 200 is operating normally.

The first and second preheating members 130 and 132 are connected to an electric power source 300 through a preheating switch 170. The preheating switch 170 is controlled by the fuel cell control unit 160 such that the preheating switch 170 selectively electrically connects the first and second preheating members 130 and 132 to the electric power source 300, thereby selectively supplying current to the first and second preheating members 130 and 132.

The vibrator 110 is connected to the electric power source 300 through a vibrator operating switch 172. The vibrator operating switch 172 is controlled by the fuel cell control unit 160 such that the vibrator operating switch 172 selectively electrically connects the vibrator 110 and the electric power source 300, thereby selectively supplying current to the vibrator 110.

An accumulator 180, as shown in FIG. 1, is connected to the fuel cell stack 200, and stores water generated by a reaction of hydrogen and oxygen in the fuel cell stack 200.

A drain member 182 is provided at a lower portion of the accumulator 180. The drain member 182 is configured to exhaust water from the accumulator 180 when an amount of water stored in the accumulator 180 goes beyond a specific value.

Figure 2:
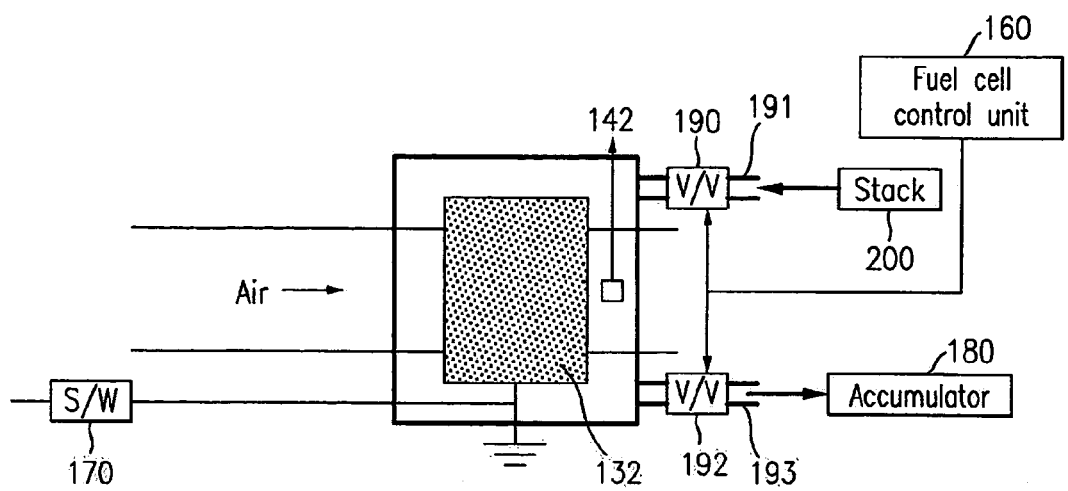
FIG. 2 is a detailed view of portion A of FIG. 1.

As shown in FIG. 2, the fuel cell stack 200 and the second preheating member 132 are connected together through a first passage 191. A first valve 190 is disposed within the first passage 191. In addition, the second preheating member 132 and the accumulator 180 are also connected together through a second passage 193, and a second valve 192 is disposed within the second passage 193.

It is preferable that the fuel cell stack 200, the first preheating member 130, and the accumulator 180 are connected together in a same manner.

If the first and second valves 190 and 192 are opened, the coolant of the fuel cell stack 200 is transmitted to the accumulator 180 via the preheating device 131. Accordingly, the hydrogen and the air can be preheated by the coolant of the fuel cell stack 200.

Operations of the first and second valves 190 and 192 are controlled by control signals from the fuel cell control unit 160.

Figure 3:
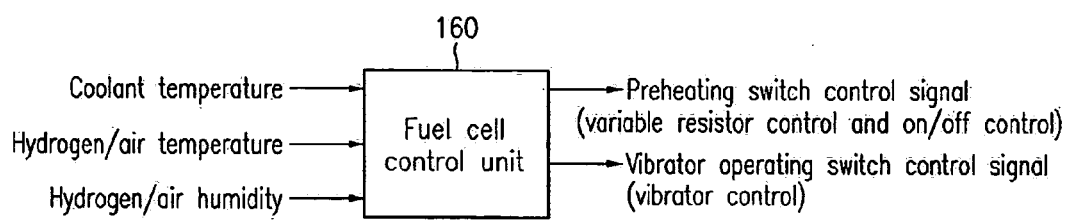
FIG. 3 shows input and output signals of a fuel cell control unit of the temperature/humidity control system according to an embodiment of the present invention.

As shown in FIG. 3, the fuel cell control unit 160 receives a coolant temperature signal, a hydrogen temperature signal, an air temperature signal, a hydrogen humidity signal, and an air humidity signal, and outputs a preheating switch control signal and a vibrator operating switch signal.

Hereinafter, a control logic path of the fuel cell control unit 160 will be explained.

The fuel cell control unit 160 generates a control signal to operate the first preheating member 130 if the hydrogen temperature detected by the first temperature sensor 140 is lower than a first predetermined temperature.

Similarly, the fuel cell control unit 160 generates a control signal to operate the second preheating member 132 if the air temperature detected by the second temperature sensor 142 is lower than the first predetermined temperature.

The first predetermined temperature can be set as a lowest temperature for satisfactory operations of the fuel cell stack 200. As an example, the first predetermined temperature can be set at 30° C.

On the other hand, the fuel cell control unit 160 generates a control signal to not operate the first preheating member 130 if the hydrogen temperature detected by the first temperature sensor 140 is higher than a second predetermined temperature.

Similarly, the fuel cell control unit 160 generates a control signal to not operate the second preheating member 132 if the air temperature detected by the second temperature sensor 142 is higher than the second predetermined temperature.

The second predetermined temperature can be set as a highest temperature for satisfactory operations of the fuel cell stack 200. As an example, the second predetermined temperature can be set at 80° C.

Initial control signals for the first and second preheating members 130 and 132 may be determined on the basis of ambient temperature.

The fuel cell control unit 160 generates a control signal to lower resistances of the variable resistors 133 and 135 of the preheating device 131 and a control signal to open the first and second valves 190 and 192, if the coolant temperature detected by the third temperature sensor 144 is higher than a third predetermined temperature. If the resistances of the preheating device 131 are lowered, heat generated by the preheating device 131 is correspondingly decreased. In this case, the hydrogen and the air are preheated by the coolant and the preheating device 131.

The third predetermined temperature can be set at a temperature above which the hydrogen and the air can be heated by the coolant. As an example, the third predetermined temperature can be set at 30° C.

The fuel cell control unit 160 generates a control signal to not operate the preheating device 131 and a control signal to open the first and second valves 190 and 192 if the coolant temperature detected by the third temperature sensor 144 is higher than a fourth predetermined temperature. That is, if the coolant temperature is higher than the fourth predetermined temperature, the hydrogen and the air are preheated only by heat of the coolant.

The fourth predetermined temperature is determined as a temperature at which the hydrogen and the air supplied to the fuel cell stack 200 can be preheated to a specific temperature only by the coolant. As an example, the fourth predetermined temperature can be set at 75° C.

In addition, the fuel cell control unit 160 generates a control signal to accelerate the vibrator 110 to increase an amount of vapor generated by the vibrator 110, if at least one of the hydrogen humidity detected by the first humidity sensor 150 and the air humidity detected by the second humidity sensor 152 is lower than a first predetermined humidity.

On the other hand, the fuel cell control unit 160 generates a control signal to decelerate the vibrator 110 to decrease an amount of vapor generated by the vibrator 110, if both of the hydrogen humidity detected by the first humidity sensor 150 and the air humidity detected by the second humidity sensor 152 are higher than a second predetermined humidity.

The first predetermined humidity and the second predetermined can be determined in consideration of an optimal operating range (e.g., a range of 80% to 100%) of the fuel cell stack 200. As an example, the first predetermined humidity can be set as 80%, and the second predetermined humidity can be set as 98%.

Hereinafter, the temperature control method for a fuel cell stack according to the embodiment of the present invention will be explained.

Figure 4A:
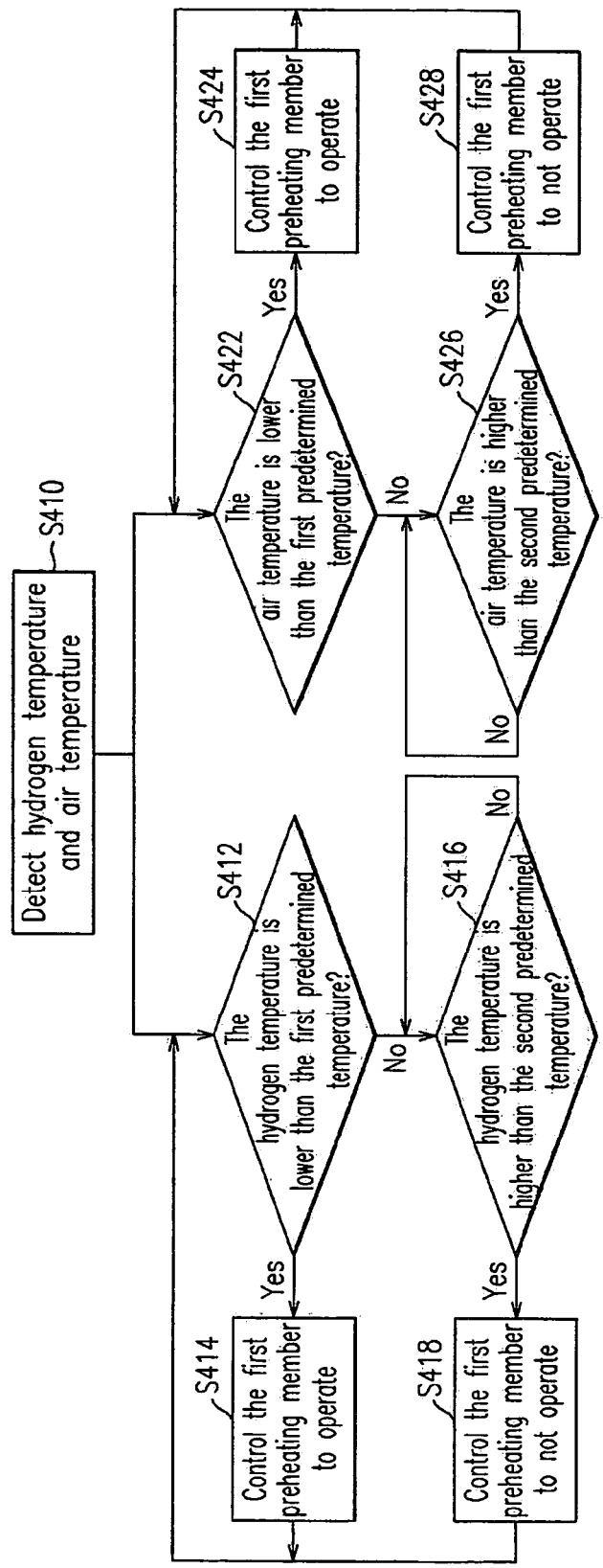
FIGS. 4A, 4B, and 5 show a temperature/humidity control method according to an embodiment of the present invention.

In FIG. 4A, a control logic path for the first preheating member 130 and the second preheating member 132 according to temperatures of the hydrogen and the air supplied to the fuel cell stack 200 is shown.

At first, in step S410, the fuel cell control unit 160 receives temperatures of the hydrogen and the air having passed the preheating device 131 from the first temperature sensor 140 and the second temperature sensor 142.

The fuel cell control unit 160 determines whether the hydrogen temperature detected by the first temperature sensor 140 is lower than the above-stated first predetermined temperature, in step S412.

If the hydrogen temperature detected by the first temperature sensor 140 is lower than the first predetermined temperature, the fuel cell control unit 160 controls the first preheating member 130 to operate in step S414. On the other hand, if the hydrogen temperature detected by the first temperature sensor 140 is not lower than the first predetermined temperature, the fuel cell control unit 160 determines whether the hydrogen temperature detected by the first temperature sensor 140 is higher than the above-stated second predetermined temperature in step S416.

If the hydrogen temperature is higher than the second predetermined temperature, the fuel cell control unit 160 controls the first preheating member 130 to not operate, in step S418.

Meanwhile, in step S422, the fuel cell control unit 160 determines whether the air temperature detected by the second temperature sensor 142 is lower than the above-stated first predetermined temperature.

If the air temperature detected by the second temperature sensor 142 is lower than the first predetermined temperature, the fuel cell control unit 160 controls the second preheating member 132 to operate, in step S424.

If the air temperature detected by the second temperature sensor 142 is not lower than the first predetermined temperature, the fuel cell control unit 160 determines whether the air temperature detected by the second temperature sensor 142 is higher than the above-stated second predetermined temperature, in step S426. If the air temperature detected by the second temperature sensor 142 is higher than the second predetermined temperature, the fuel cell control unit 160 controls the second preheating member 132 to not operate, in step S428.

Figure 4B:
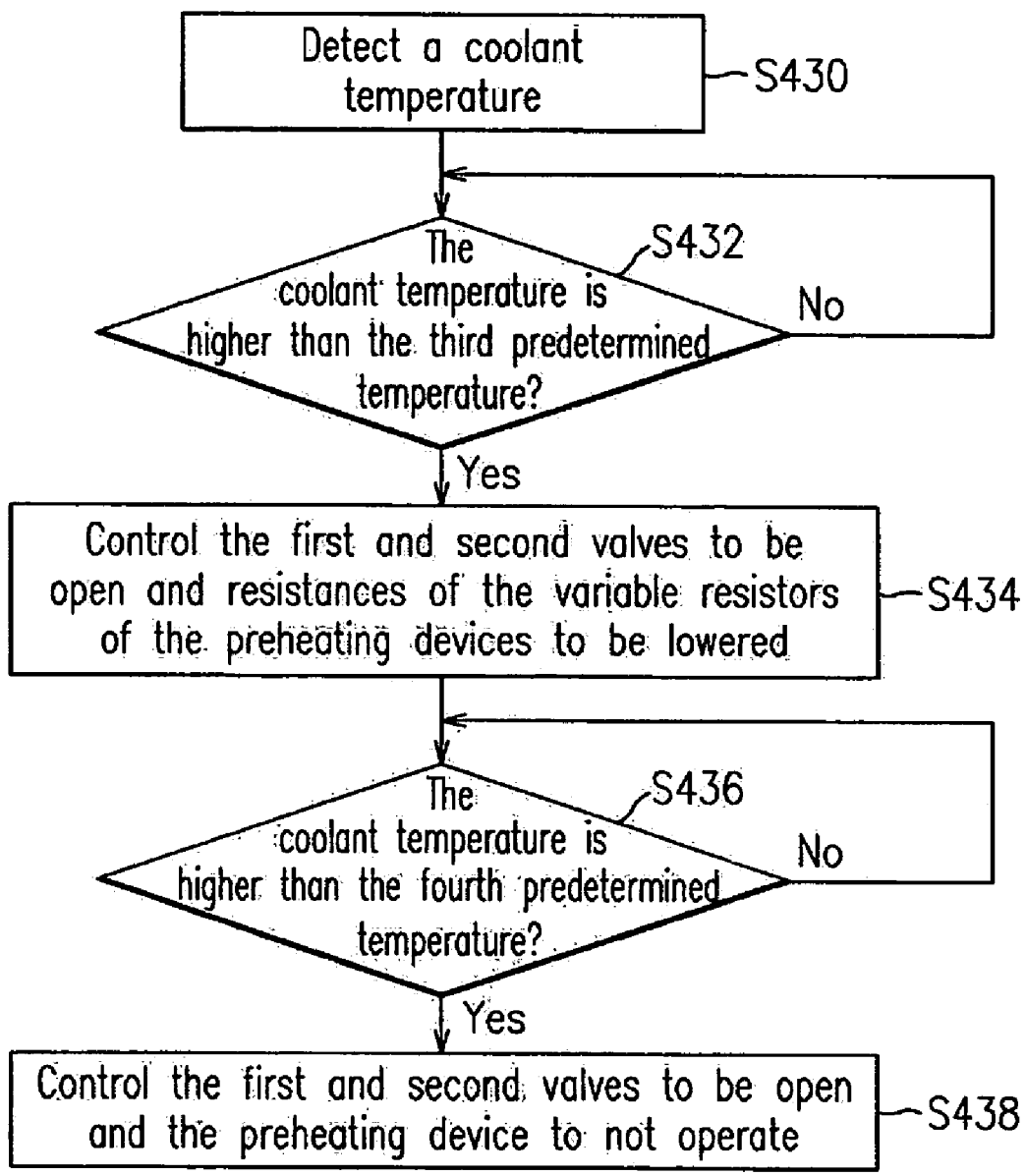

In FIG. 4B, a control logic path for the first preheating member 130 and the second preheating member 132 according to the temperature of the coolant of the fuel cell stack 200 is shown. At first, in step S430, the fuel cell control unit 160 receives a temperature of the coolant of the fuel cell stack 200 detected by the third temperature sensor 144.

In step S432, the fuel cell control unit 160 determines whether the coolant temperature detected by the third temperature sensor 144 is higher than the above-stated third predetermined temperature.

If the coolant temperature is higher than the third predetermined temperature, the fuel cell control unit 160 controls the first and second valves 190 and 192 to be open and controls the resistances of the variable resistors 133 and 135 of the preheating device 131 to be lowered, in step S434.

Then, in step S436, the fuel cell control unit 160 determines whether the coolant temperature is higher than the above-stated fourth predetermined temperature. If the coolant temperature is higher than the fourth predetermined temperature, the fuel cell control unit 160 controls the first and second valves 190 and 192 to be open and controls the preheating device 131 to not operate, in step S438.

Figure 5:
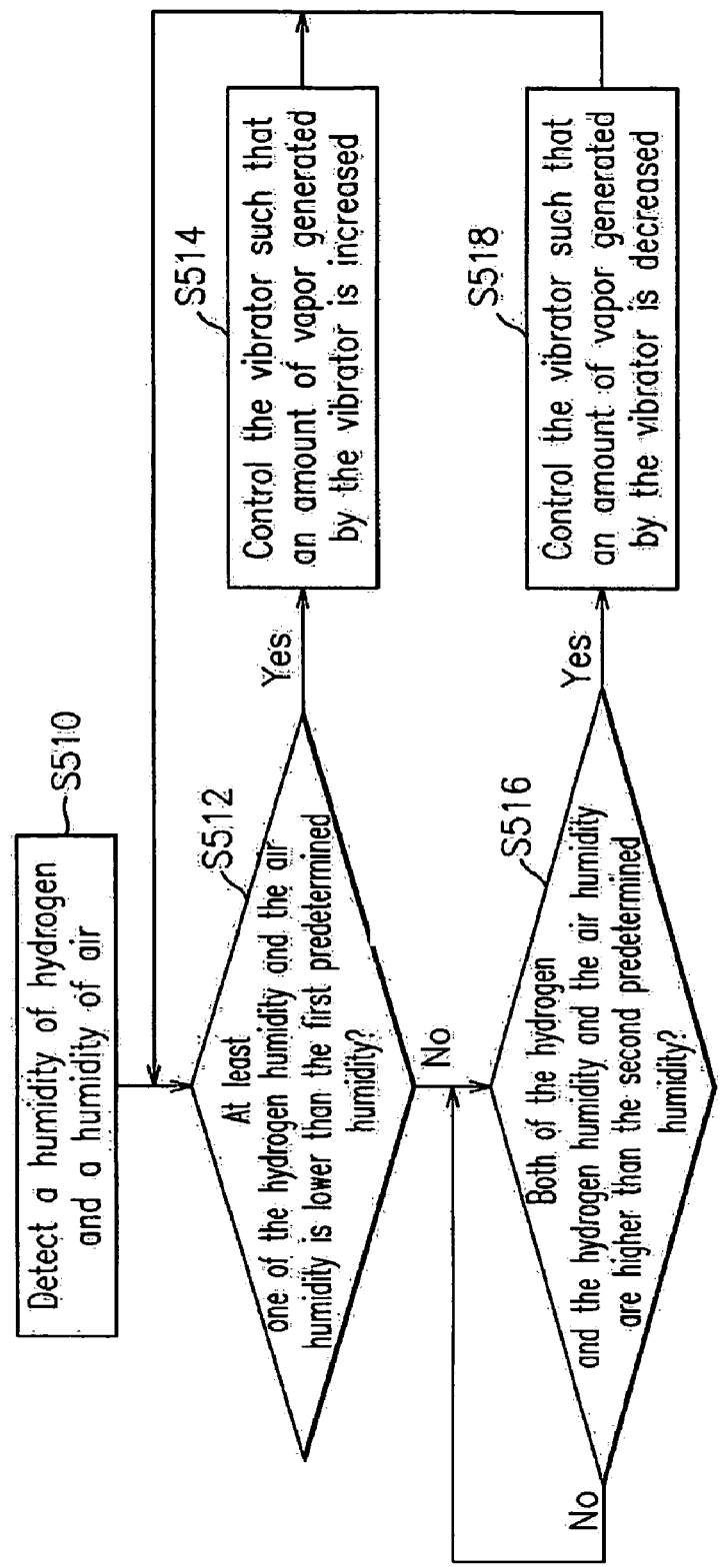

Hereinafter, referring to FIG. 5, a humidity control method according to the embodiment of the present invention will be explained.

At first, in step S510, the fuel cell control unit 160 receives a humidity value of the hydrogen having passed the first mixing member 120 from the first humidity sensor 150 and a humidity value of the air having passed the second mixing member 122 from the second humidity sensor 152. Then, in step S512, the fuel cell control unit 160 determines whether at least one of the hydrogen humidity and the air humidity is lower than the above-stated first predetermined humidity.

If at least one of the hydrogen humidity and the air humidity is lower than the first predetermined humidity, the fuel cell control unit 160 controls the vibrator 110 such that an amount of the vapor generated by the vibrator 110 is increased, in step S514.

On the other hand, if the determination in step S512 is negative, the fuel cell control unit 160 determines whether both of the hydrogen humidity and the air humidity are higher than the above-stated second predetermined humidity, in step SS516.

If it is determined that both of the hydrogen humidity and the air humidity are higher than the second predetermined humidity, the fuel cell control unit 160 controls the vibrator 110 such that an amount of the vapor generated by the vibrator 110 is decreased, in step S518.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

According to the embodiment of the present invention, humidifying and preheating of hydrogen and air supplied to the fuel cell stack can be effectively performed, so that startability and energy efficiency can be improved. Therefore, starting time can be shortened, and damage to a membrane can be minimized.

Furthermore, the control logic can be substantially simplified because of a deletion of blowers when compared to the prior control system. Also, a size of the system is substantially decreased.

Still furthermore, because the hydrogen and the air are preheated by the coolant of the fuel cell stack, energy for heating the hydrogen and the air can be decreased. Because of this, energy consumption for cooling the coolant of the fuel cell stack can be decreased.

What is claimed is:

1. A temperature/humidity control system for a fuel cell stack, comprising:
    a humidifying device having a vibrator configured to convert water into vapor, a storage member storing the vapor generated by the vibrator, and at least one mixing member configured to humidify hydrogen and air that are supplied to the fuel cell stack with the vapor stored in the storage member;
    a preheating device configured to preheat the hydrogen and air humidified by the at least one mixing member;
    at least one temperature sensor detecting temperatures of the hydrogen and the air having passed the preheating device and a temperature of coolant of the fuel cell stack, and outputting corresponding signals;
    at least one humidity sensor detecting humidities of the hydrogen and the air having passed the humidifying device and outputting corresponding signals; and
    a fuel cell control unit controlling the humidifying device and the preheating device based on signals from the at least one temperature sensor and the at least one humidity sensor.

2. The control system of claim 1, wherein the mixing member comprises:
    a first mixing member disposed in a hydrogen supply line; and
    a second mixing member disposed in an air supply line.

3. The control system of claim 2, wherein each of the first mixing member and the second mixing member includes a venturi tube that is configured to draw the vapor from the storage member.

4. The control system of claim 1, wherein the preheating device comprises:
    a first preheating member that is disposed in a hydrogen supply line; and
    a second preheating member that is disposed in an air supply line.

5. The control system of claim 4, wherein each of the first and second preheating members includes a variable resistor that is able to emit heat by a current flow therethrough.

6. The control system of claim 1, wherein the preheating device comprises at least one preheating member configured to emit heat using supplied current, and a preheating switch being able to selectively electrically connect the preheating member and an electric power source together in response to a control signal of the fuel cell control unit, and wherein the humidifying device further comprises a vibrator operating switch that is configured to selectively electrically connect the vibrator and the electric power source together.

7. The control system of claim 1, further comprising an accumulator that is configured to store water generated by a reaction between hydrogen and water in the fuel cell stack.

8. The control system of claim 7, further comprising a drain portion that is installed to the accumulator, the drain portion being configured to exhaust water stored therein when an amount of stored water is greater than a specific level.

9. The control system of claim 7, wherein the preheating device is connected to the fuel cell stack through a first passage and the accumulator is connected to the preheating device through a second passage such that coolant in the fuel cell stack can be transferred to the accumulator via the preheating device, a first valve is disposed within the first passage to control a flow of coolant from the fuel cell stack to the preheating device, a second valve is disposed within the second passage to control a flow of coolant from the preheating device to the accumulator, and operations of the first and second valves are controlled by the fuel cell control unit.

10. The control system of claim 9, wherein the preheating device includes a variable resistor, a resistance of which is controlled by the fuel cell control unit and that is configured to emit heat according to a current flow, and wherein the at least one temperature sensor includes a third temperature sensor detecting a temperature of the coolant in the fuel cell stack, and wherein the fuel cell control unit controls the first and second valves to be open and the variable resistor to lower the resistance thereof if a coolant temperature detected by the third temperature sensor is higher than a third predetermined temperature.

11. The control system of claim 10, wherein the control unit controls the first and second valves to be open and the preheating device to not operate if the coolant temperature detected by the third temperature sensor is higher than a fourth predetermined temperature.

12. The control system of claim 11, wherein the fourth predetermined temperature is determined as a temperature at which hydrogen and air supplied to the fuel cell stack can be preheated to a specific temperature only by the coolant that is transferred to the accumulator from the fuel cell stack via the preheating device.

13. The control system of claim 1, wherein the at least one temperature sensor comprises:
    a first temperature sensor detecting a temperature of hydrogen having passed the preheating device; and
    a second temperature sensor detecting a temperature of air having passed the preheating device.

14. The control system of claim 13, wherein the fuel cell control unit controls the preheating device to preheat hydrogen supplied to the fuel cell stack if a hydrogen temperature detected by the first temperature sensor is lower than a first predetermined temperature, and wherein the fuel cell control unit controls the preheating device to preheat air supplied to the fuel cell stack if an air temperature detected by the second temperature sensor is lower than the first predetermined temperature.

15. The control system of claim 13, wherein the fuel cell control unit controls the preheating device to not preheat hydrogen supplied to the fuel cell stack if a hydrogen temperature detected by the first temperature sensor is higher than a second predetermined temperature, and wherein the fuel cell control unit controls the preheating device to not preheat air supplied to the fuel cell stack if an air temperature detected by the second temperature sensor is higher than the second predetermined temperature.

16. The control system of claim 1, wherein the at least one humidity sensor comprises:
    a first humidity sensor detecting a humidity of hydrogen having passed the humidifying device and outputting a corresponding signal; and
    a second humidity sensor detecting a humidity of air having passed the humidifying device and outputting a corresponding signal.

17. The control system of claim 16, wherein the fuel cell control unit controls the vibrator such that an amount of vapor generated by the vibrator is increased if at least one of a hydrogen humidity detected by the first humidity sensor and an air humidity detected by the second humidity sensor is lower than a first predetermined humidity.

18. The control system of claim 16, wherein the fuel cell control unit controls the vibrator such that an amount of vapor generated by the vibrator is decreased if both of the hydrogen humidity detected by the first humidity sensor and the air humidity detected by the second humidity sensor are higher than a second predetermined humidity.

19. The control system of claim 1, wherein the at least one temperature sensor comprises a third temperature sensor detecting a temperature of coolant in the fuel cell stack, and wherein the fuel cell control unit controls hydrogen and air supplied to the fuel cell stack to be preheated by at least one of the preheating device and the coolant in the fuel cell stack, based on the detected coolant temperature.

20. The control system of claim 19, wherein the hydrogen and the air supplied to the fuel cell stack are preheated only by the preheating device if the coolant temperature is lower than a third predetermined temperature.

21. The control system of claim 19, wherein the hydrogen and the air supplied to the fuel cell stack are preheated by the preheating device and the coolant in the fuel cell stack if the coolant temperature is between the third predetermined temperature and a fourth predetermined temperature.

22. The control system of claim 19, wherein the hydrogen and the air supplied to the fuel cell stack are preheated only by the coolant if the coolant temperature is higher than a fourth predetermined temperature.

23. A temperature/humidity control method for a fuel cell stack using a humidifying device capable of humidifying hydrogen and air supplied to the fuel cell stack and a preheating device capable of preheating the hydrogen and air supplied to the fuel cell stack, comprising:
    detecting temperatures of hydrogen and air having passed a preheating device;
    detecting humidities of the hydrogen and the air having passed a humidifying device; and
    controlling the humidifying device and the preheating device based on temperatures and humidities of the hydrogen and the air.

24. A temperature control method for a fuel cell stack using a preheating device capable of preheating hydrogen and air supplied to the fuel cell stack, comprising:
    detecting a temperature of hydrogen having passed a preheating device;
    detecting a temperature of air having passed a preheating device; and
    controlling the preheating device based on the detected hydrogen temperature and the detected air temperature.

25. The control method of claim 24, wherein the controlling the preheating device controls the preheating device to preheat the hydrogen supplied to the fuel sell stack if the detected hydrogen temperature is lower than a first predetermined temperature, and wherein the controlling the preheating device controls the preheating device to preheat the air supplied to the fuel cell stack if the detected air temperature is lower than the first predetermined temperature.

26. The control method of claim 24, wherein the controlling the preheating device controls the preheating device to not preheat the hydrogen supplied to the fuel cell stack if the detected hydrogen temperature is higher than a second predetermined temperature, and wherein the controlling the preheating device controls the preheating device to not preheat the air supplied to the fuel cell stack if the detected air temperature is higher than the second predetermined temperature.

27. The control method of claim 24, further comprising:
    detecting a temperature of coolant in the fuel cell stack; and
    allowing the coolant to circulate through the preheating device to preheat the hydrogen and the air supplied to the fuel cell stack and simultaneously decreasing the amount of heat generated by the preheating device, if the detected coolant temperature is higher than a third predetermined temperature.

28. The control method of claim 27, further comprising allowing the coolant to circulate through the preheating device to preheat the hydrogen and the air supplied to the fuel cell stack and stopping an operation of the preheating device, if the detected temperature is higher than a fourth predetermined temperature.

29. The control method of claim 28, wherein the fourth predetermined temperature is determined as a temperature at which the hydrogen and the air supplied to the fuel cell stack can be preheated only by the coolant to a specific temperature.

30. The control method of claim 24, further comprising detecting a temperature of coolant inside the fuel cell stack, and
    wherein the controlling the preheating device controls hydrogen and air supplied to the fuel cell stack to be preheated by at least one of the preheating device and the coolant in the fuel cell stack, based on the detected coolant temperature.

31. The control method of claim 30, wherein the hydrogen and the air supplied to the fuel cell stack are preheated only by the preheating device if the coolant temperature is lower than a third predetermined temperature.

32. The control method of claim 30, wherein the hydrogen and the air supplied to the fuel cell stack are preheated by the preheating device and the coolant in the fuel cell stack if the coolant temperature is between the third predetermined temperature and a fourth predetermined temperature.

33. The control method of claim 30, wherein the hydrogen and the air supplied to the fuel cell stack are preheated only by the coolant if the coolant temperature is higher than a fourth predetermined temperature.

* * * * *